United States Patent [19]

Gilchrist

[11] Patent Number: 5,144,594
[45] Date of Patent: Sep. 1, 1992

[54] ACOUSTIC MOUSE SYSTEM

[75] Inventor: Ian R. Gilchrist, Timonium, Md.

[73] Assignee: Cyber Scientific, Baltimore, Md.

[21] Appl. No.: 706,755

[22] Filed: May 29, 1991

[51] Int. Cl.⁵ .............................................. G09G 3/02
[52] U.S. Cl. .................................... 367/129; 367/907; 178/18
[58] Field of Search ....................... 367/907, 118, 129; 178/18; 340/709, 710

[56] References Cited

U.S. PATENT DOCUMENTS

| | | | |
|---|---|---|---|
| 4,012,588 | 3/1977 | Davis et al. | 178/18 |
| 4,814,552 | 3/1989 | Stefik et al. | 178/18 |
| 4,862,152 | 8/1989 | Milner | 367/907 |
| 4,991,148 | 2/1991 | Gilchrist | 367/124 |

Primary Examiner—Daniel T. Pihulic
Attorney, Agent, or Firm—Perman & Green

[57] ABSTRACT

An acoustic mouse system is described that controls indications on an X-Y surface of the face of a display. The system comprises a support for holding at least three acoustic receivers in an x-y plane, and a hand movable acoustic transmitter that is movable both parallel to the x-y plane and in a z direction perpendicular to the x-y plane. The transmitter generates periodic acoustic oscillations in the direction of the support and its receivers. Detection circuitry, responsive to signals from the acoustic receivers, provides signals indicative of the absolute position of the acoustic transmitter in the x-y plane. A processor is responsive to the signals from the detection circuitry to provide absolute position signals to the display, whereby the display responds by moving an indication to a corresponding position on the X-Y surface of the display face. The detector circuitry is further enabled to provide z position signals to the display, whereby the display may modify a display function in accordance with the z position signals.

16 Claims, 5 Drawing Sheets

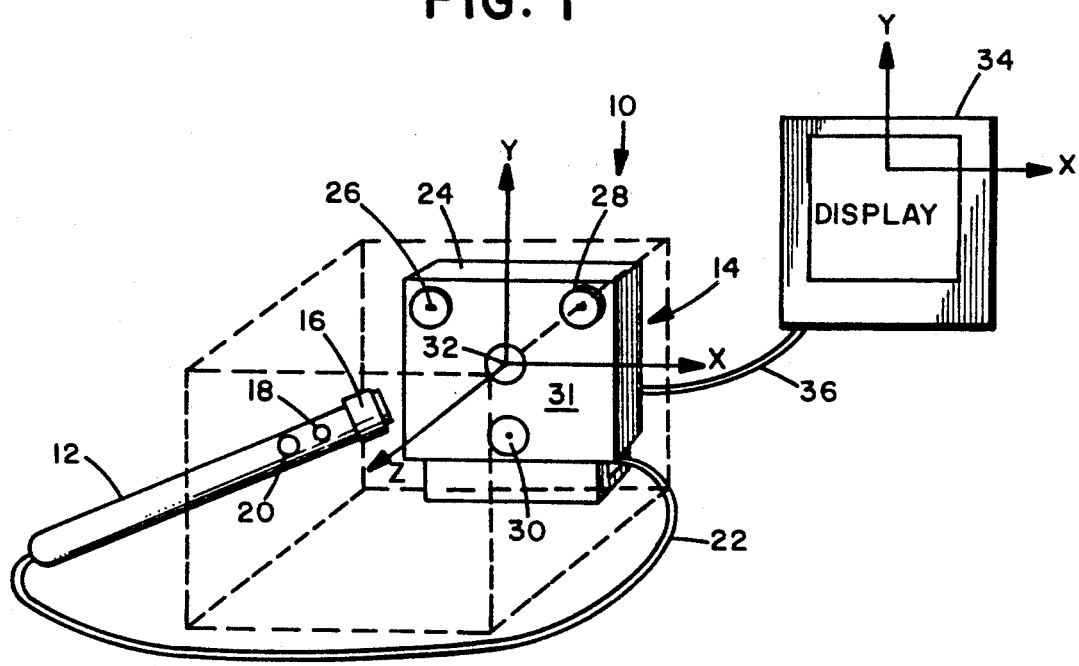
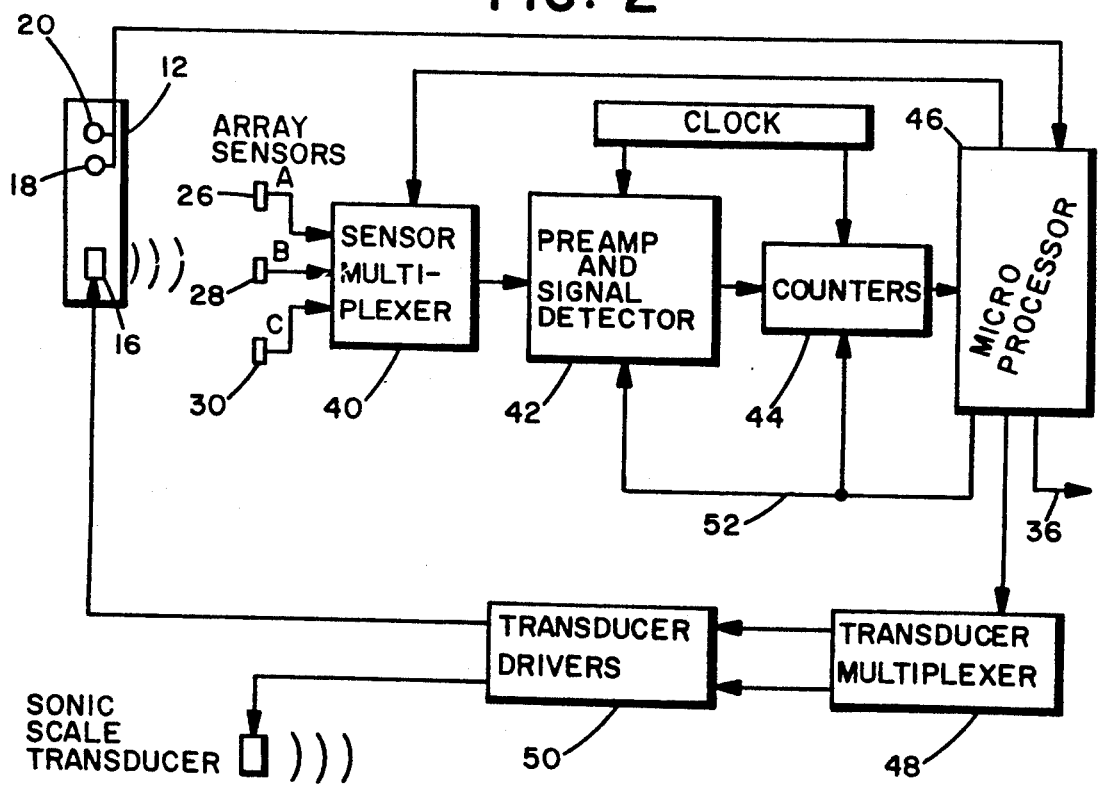

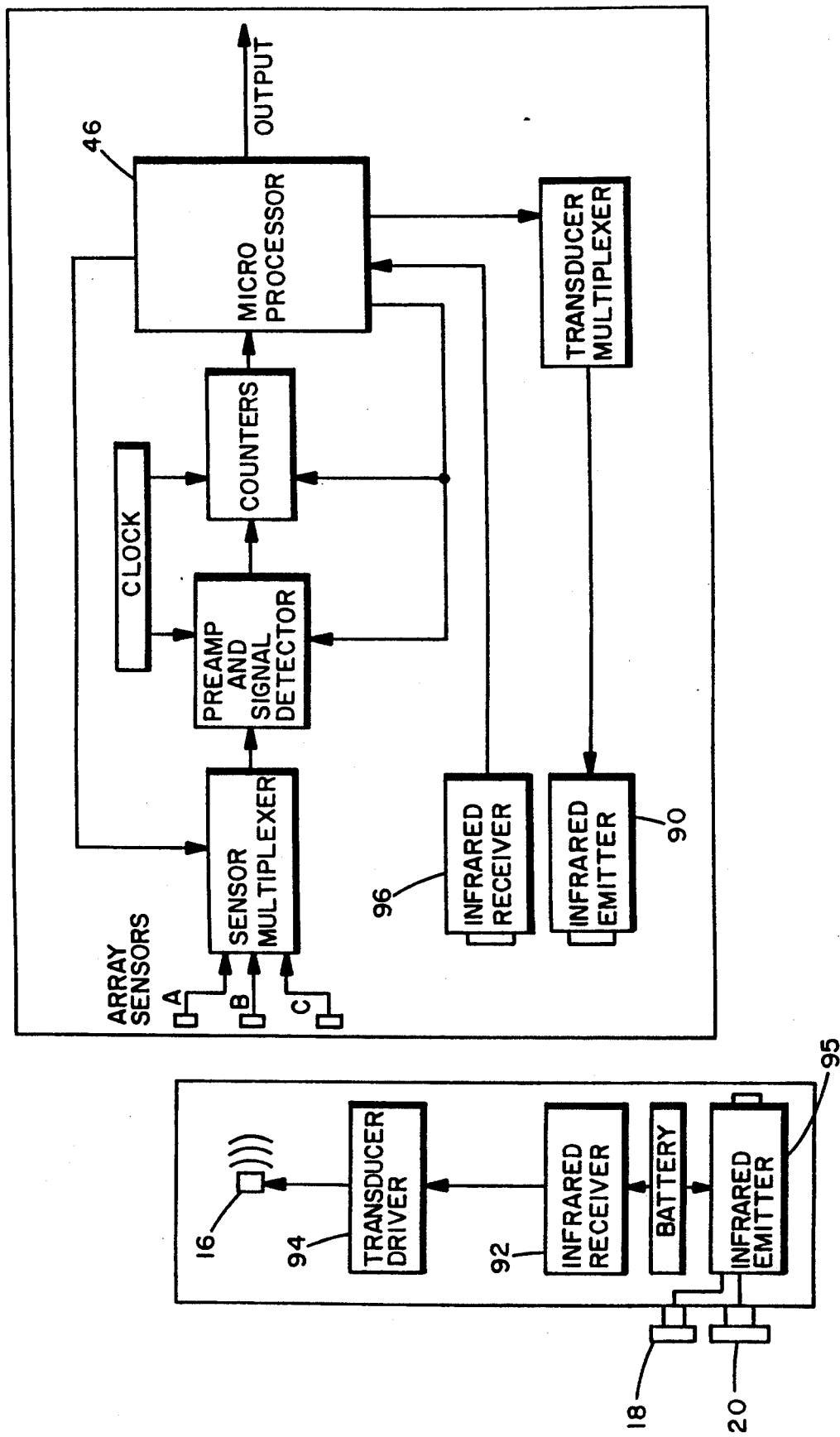

ACOUSTIC MOUSE SYSTEM

FIELD OF THE INVENTION

This invention relates to an apparatus for locating a point in three-dimensional space and, more particularly, to an apparatus for controlling a display's functions in accordance with the point's location.

BACKGROUND OF THE INVENTION

Mouse systems for providing cursor position control signals to video displays are well known. In general, such mouse systems provide relative information to the display to enable repositioning of a cursor. The mouse provides position signals indicative of an amount and direction of its travel, which signals cause the cursor to be moved a like amount and direction. Mouse systems use both mechanical and optical position detecting means to enable the generation of their cursor position signals.

One problem with prior art mouse systems is that they require the availability of a relatively flat dedicated surface over which the mouse can be moved. Such a surface area is not always available on a user's desk. Furthermore, such mouse systems only provide x-y data and provide no ability to input z dimension data for control of a display's functions.

An allied technology i.e., acoustic position location systems, has been used to provide absolute position input information for digital systems. Such acoustic systems are employed for direct digitization of spatial x, y and z dimension points and enable subsequent computer analysis of the device/space/system whose points are digitized. In U.S. Pat. No. 4,991,148 to the inventor hereof, entitled "Acoustic Digitizing System", a position sensing apparatus is described wherein an acoustic point source transmitter transmits a sequence of periodic oscillations, which oscillations are employed to enable the location of the point source transmitter. The position determination is open loop, depends upon analysis of an initial portion of a received acoustic signal and is relatively noise-immune. The teachings of the '148 Patent are incorporated herein by reference.

Additional related teachings of the inventor hereof may be found in copending U.S. patent application Ser .Nos. 07/606,558, entitled "Omni-Directional Ultrasonic Transducer", Ser. No. 07/606,551 entitled "Circuit For Driving An Acoustic Transducer"; and U.S. patent application Ser. No. 07/606,582 entitled "Acoustic Signal Detection Circuit". The disclosures of each of the three aforementioned patent applications are incorporated herein by reference.

In addition to the above-noted, cross referenced patent and patent applications, the following references are representative of other types of acoustic position input devices. In U.S. Pat. No. 4,012,588 of Davis et al., an acoustic position location system is described which employs a spark gap mounted in a stylus to generate acoustic signals. Piezoelectric receivers are employed to convert the acoustic signals to electrical signals, which signals are then employed to determine the spatial position of the spark gap. In U.S. Pat. No. 4,814,552 to Stefik et al., a cordless acoustic position determination system is described wherein an infrared system is used to enable the stylus to indicate to the receiver system when an acoustic signal has been generated, thereby enabling the receiver to be prepared to determine the distance of the stylus when the acoustic signals are received by receiving transducers.

Accordingly, it is an object of this invention to provide an improved mouse system for a display.

It is another object of this invention to provide an improved mouse system which provides x, y and z dimensional data for input to a display.

It is still another object of this invention to provide an acoustic mouse that provides absolute x y and z data for control of display functions.

It is another object of this invention to provide an acoustic mouse which can be directly mounted on a user's hand.

SUMMARY OF THE INVENTION

An acoustic mouse system is described that controls indications on an X-Y surface of the face of a display. The system comprises a support for holding at least three acoustic receivers in an x-y plane, and a hand movable acoustic transmitter that is movable both parallel to the x-y plane and in a z direction perpendicular to the x-y plane. The transmitter generates periodic acoustic oscillations in the direction of the support and its receivers. Detection circuitry, responsive to signals from the acoustic receivers, provides signals indicative of the absolute position of the acoustic transmitter in the x-y plane. A processor is responsive to the signals from the detection circuitry to provide absolute position signals to the display, whereby the display responds by moving an indication to a corresponding position on the X-Y surface of the display face. The detector circuitry is further enabled to provide z position signals to the display, whereby the display may modify a display function in accordance with the z position signals.

BRIEF DESCRIPTION OF THE DRAWINGS

FIG. 1 is a schematic perspective of an acoustic mouse system incorporating the invention hereof, in combination with a display.

FIG. 2 is a high level block diagram showing circuitry incorporated in the acoustic mouse system.

FIG. 6 is a circuit diagram of a cordless acoustic mouse system.

DETAILED DESCRIPTION OF THE INVENTION

Figure 3A:
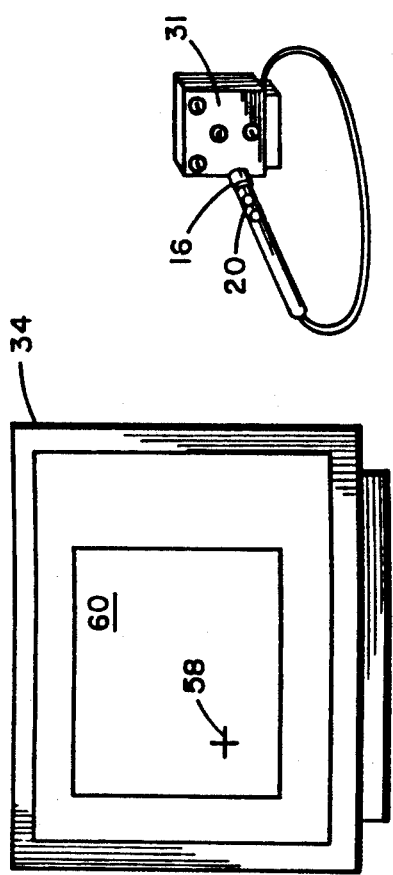
FIG. 3a shows an exemplary display face that is responsive to a first z position of an acoustic stylus.

Referring to FIG. 1, mouse 10 comprises an acoustic transmitting stylus 12 and an acoustic receiving array 14. Stylus 12 includes a point source acoustic transmitter 16 and a pair of control buttons 18 and 20. A cable 22 connects stylus 12 to a housing 24 which, in turn, contains three acoustic receiving sensors 26, 28 and 30 positioned about planar face 31. A fourth acoustic transmitting transducer 32 is also included for calibration purposes. A display 34 is connected to acoustic mouse 10 via cable 36.

Acoustic mouse 10 contains circuitry that provides signals to display 34 that are indicative of the position of transmitter 16 (on stylus 12) in an x, y, z coordinate system. In one embodiment, transmitter 16 is caused to emit a periodic signal towards receiving sensors 26, 28 and 30. Dependent upon the time of arrival of the wave front of an initial cycle of the periodic signal, circuitry connected to receiving transducers 26, 28 and 30 provides indications of the distance of transmitter 16 therefrom. A microprocessor within acoustic mouse 10 then calculates the absolute position of transmitter 16 in the x,y,z coordinate system and provides signals indicative thereof over cable 36 to display 34.

In response to the x and y position signals from acoustic mouse 10, display 34 positions a cursor at an identical X, Y position on its display face. The z dimension information received from acoustic mouse 10 may then be used by display 34 to control any of a number of display or data processing functions. For instance, if the z position of transmitter 16 falls within one range of distances from planar face 31, display 34 may be caused to show a particular pop-up window. If transmitter 16 is at another distance from planar face 31, cursor movement on display 34 may be constrained to only within a particular pop-up window on the screen. The z position data can also be used, in combination with the x, y data to provide three dimensional coordinate data to enable a 3-d display with hidden line/surface discrimination capability.

The invention will be better understood by referring to FIG. 2 wherein a block diagram of the circuitry contained within acoustic mouse 10 is illustrated.

As described above, stylus 12 includes a transmitting transducer 16 as well as a pair of control buttons 18 and 20. An acoustic signal is transmitted at a predetermined update rate from transducer 16 to receiving sensors 26, 28 and 30. A sensor multiplexer circuit 40 sequentially samples the signal levels emanating from receivers 26, 28 and 30 and provides them to preamplifier and signal detector circuit 42. That circuit detects an initial portion of a received acoustic signal and provides an indication thereof to a counter in counters module 44. Preferred signal detection circuits can be found in the cross referenced U.S. Pat. No. 4,991,148 and in copending patent application Ser. No. 07/606,582.

A microprocessor 46 controls the operation of the acoustic mouse. Microprocessor 46 causes transmitting transducer 16 to be actuated via signals provided to transducer multiplexer 48 and transducer driver 50. At the same time, microprocessor 46 provides a start signal to counters within counters circuit 44. There is at least one counter within counter circuit 44, providing range counts for each acoustic sensor 26, 28 and 30 (which are sequentially multiplexed).

When preamplifier and signal detector circuit 42 provides an indication of an initial portion of an acoustic signal sensed by one of receiving sensors 26, 28 or 30, the counter in counter module 44 is stopped. The stopped counter then holds a count indicative of a range distance between one sensor and transmitter 16. When the counter within counter module 44 has stopped, the range counts are fed to microprocessor 46 which then calculates absolute x, y and z coordinates of transmitter 16.

Button 18 on stylus 12 controls the generation of standard mouse commands that enable selection of menus, text highlighting, etc. Button 20, however, when activated by a user, provides a "z" select signal to microprocessor 46. Until switch 20 is depressed, microprocessor 46 does not transmit z coordinate data over cable 36 to display 34.

However, upon the actuation of button 20, microprocessor 46 reads the z coordinate value; determines an integer number based on the distance of transmitter 16 from planar face 31 (e.g. a 1 for 0 inches to 0.5 inches, a 2 for 0.5 inches to 1 inch, a 3 for 1 to 1.5 inches, etc.); and transmits the integer with a "z" control signal over cable 36 to display 34. In response, display 34 reads the integer value and, in accordance with a preprogrammed logic chain, chooses a display function in accordance with that value. Display 34 maintains the z control integer value as a valid value until a next z control integer value is transmitted over cable 36.

As indicated above, motion of transmitter 16 in the z direction provides a control modality for implementing pop-up windows or other display functions on display 34. For example, z dimension inputs can control the presentation of different windows on display 34. Thus, the distance of transducer 16 from planar 31 face, will control which one of a plurality of windows will be indicated on display 34. Since the z control is only effective when switch 20 is depressed, the selection of a window on display 34 will remain in effect until a next depression of switch 20 at which point, a new z control signal will be fed and either a new one will be displayed or some other display function actuated. This function is illustrated in FIGS. 3a and 3b.

Figure 3B:
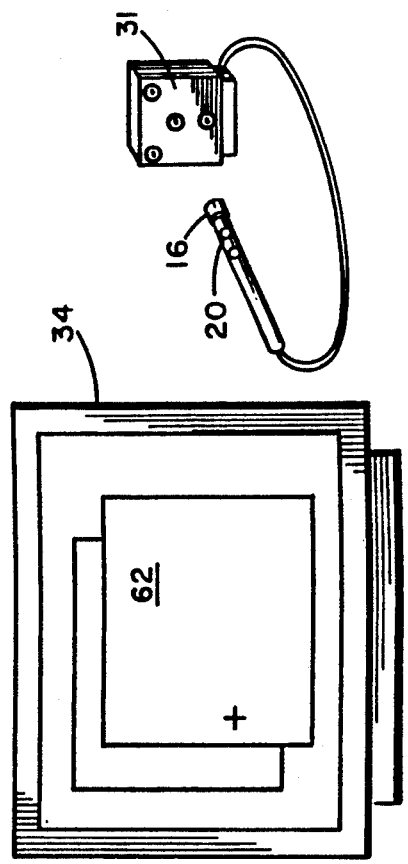
FIG. 3b shows an altered display that is responsive to a new z position of an acoustic stylus.

In FIG. 3a, transmitter 16 is relatively close to planar face 31. As a result, the x, y position data causes cursor 58 to be positioned as shown on display 34 and, assuming that button 20 is depressed, the z position of transducer 16 causes a window 60 to be displayed. In FIG. 3b, transmitter 16 has been removed further from planar face 31. As a result, assuming button 20 has been actuated, a second window 62 is shown on display 34. In order to remove all windows, transducer 16 may be moved close to one of the receiving sensors and then the z control button actuated at which point all windows disappear from display 34.

An alternate approach for z control is to eliminate button 20, and restrict the x-y tracking plane to a specific z level. Within that z level, button 18 is monitored for standard mouse control signals. Outside of that plane, button 18 is monitored for z control, and not x-y cursor motion. The z control then operates as described in the previous paragraphs, except with single button control.

Figure 4:
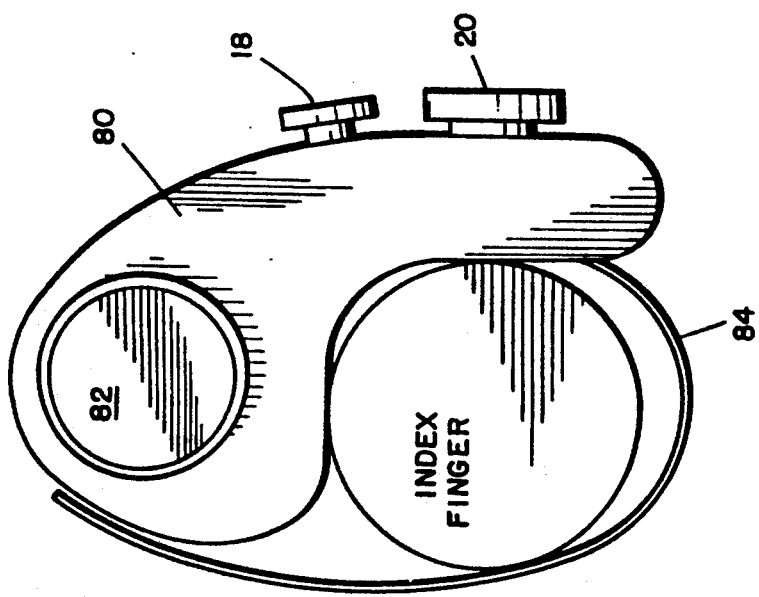
FIG. 4 is a plan view of an acoustic stylus which is finger-mountable.
Figure 5:
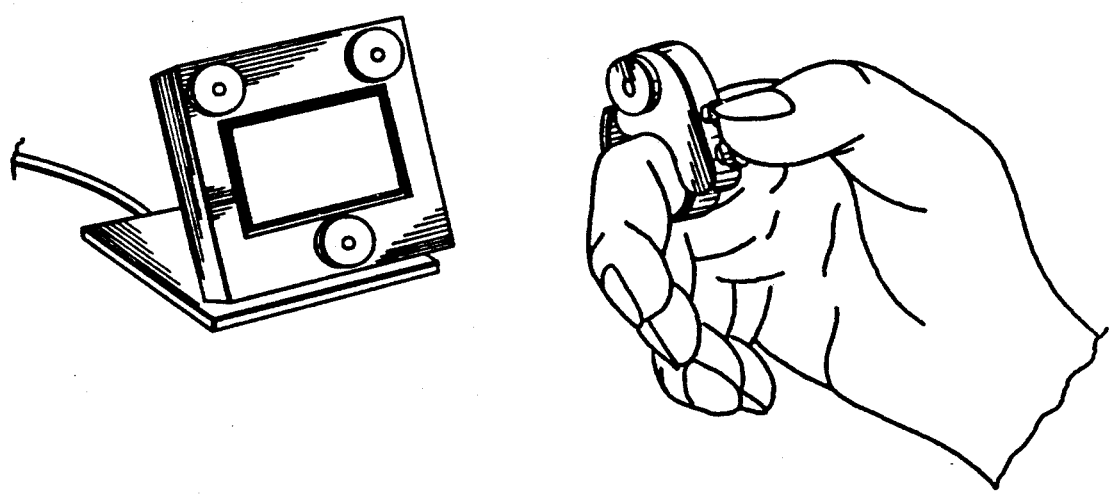
FIG. 5 is a perspective view showing the relationship of the finger-mountable stylus of FIG. 4 in relation to an acoustic receiving module.

Referring now to FIGS. 4 and 5, an alternate structure for an acoustic transmitter is illustrated. In this instance, the acoustic transmitter comprises a transducer 82 contained within a housing 80 which is designed to partially surround a user's index finger. A flexible Velcro wrap 84 holds housing 80 to the user's finger in such a manner as to enable the user's thumb to actuate either of switches 18 or 20 through thumb action. A perspective view of the finger mounted transducer is shown in FIG. 5. In ordinary use, the face of transducer 82 is pointed at the receiving sensors. The structure shown in FIGS. 4 and 5 enables the user's hand movements to directly control the position of a cursor on the face of a display as well as to control display functions as aforedescribed.

Referring now to FIG. 6, a cordless acoustic mouse system is shown. In this instance, an infrared emitter 90 transmits a signal to infrared receiver 92 upon command of microprocessor 46. Upon receiving the infrared signal, infrared receiver 92 causes transducer driver 94 to impulse transmitter 16 thereby causing an acoustic signal to be generated. An infrared transmitter 95 is used to transmit a mouse command signal using button 18, or a z control signal to infrared receiver 96 when button 20 is depressed. In other respects, the circuitry shown in FIG. 6 operates similarly to that shown in FIG. 2.

Figure 7:
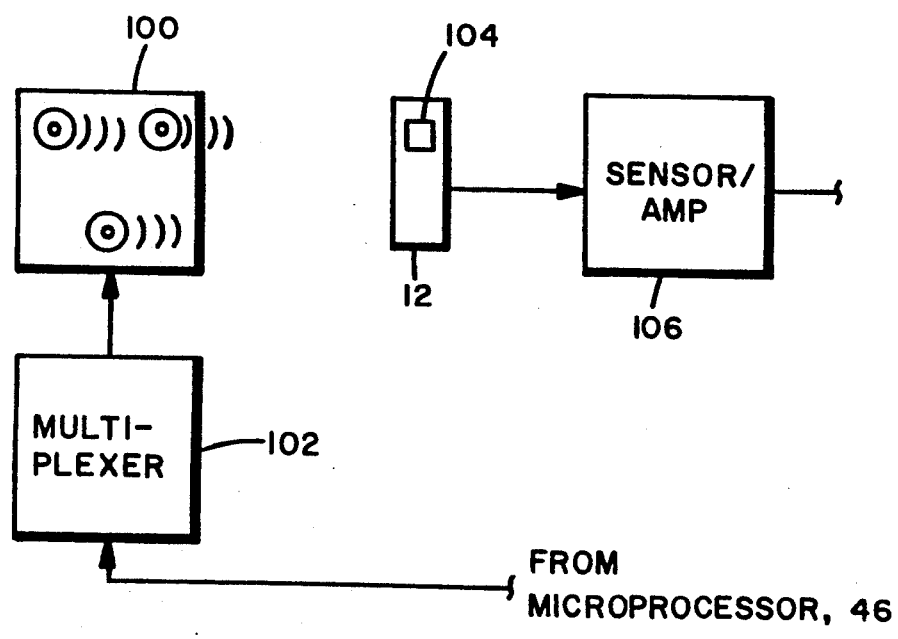
FIG. 7 shows modifications to the circuit diagram of FIG. 2 when the functions of the stylus and receiver array are reversed.

Referring now to FIG. 7, an embodiment of the invention is illustrated wherein the functions of the stylus and receiving array have been reversed. In this instance, transducer array 100 is now a transmitting array which is connected to microprocessor 46 via a multiplexer 102. Each of the transmitting transducers in array 100 is sequentially caused to transmit an acoustic signal to a receiving sensor 104 mounted in stylus 12. Those signals are fed to a sensor/amplifier circuit 106 and are then fed to a signal detector and counter circuit, much the same as that shown in FIG. 2. In essence, therefore, by controlling the distance counters via a signal used to control multiplexer 102, the functions of array 100 and stylus 104 can be reversed. As with the circuit of FIG. 6, the system of FIG. 7 can be operated in a cordless mode by employing infrared emitter/sensor communication links.

Figure 8:
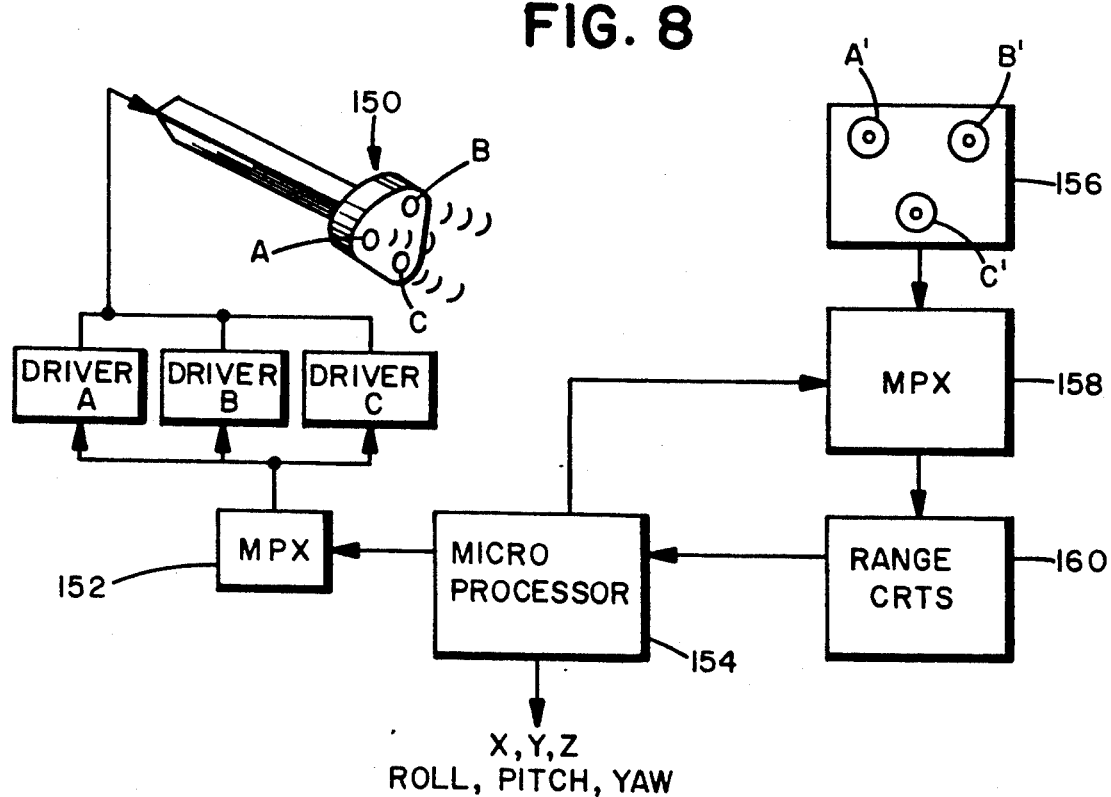
FIG. 8 is a block diagram showing an embodiment of the invention that enables pitch, yaw and roll of a stylus to be determined.

In FIG. 8, a system incorporating the invention hereof, provides further data as to pitch, roll and yaw of a transmitter array. In this embodiment, a stylus is provided with a three acoustic transmitter head 150. A driver is provided for each transmitter, which drivers (A-C) are controlled by a multiplexer 152 that is, in turn, controlled by microprocessor 154. A three sensor array 156 (A'-C') has its outputs multiplexed by multiplexer 158 to range circuits 160. Range circuits 160 are identical in construction to circuits 42 and 44 shown in FIG. 2. The outputs from range circuits 160 allow microprocessor 154 to calculate not only the x, y, and z coordinates of each of transmitters A, B and C, but also to calculate the roll, pitch and yaw of head 150.

In operation, drivers A, B, and C each respectively operate transmitters A B and C in the following manner. First, driver A impulses transmitter A three times, ,in sequence,. During this period, sensors A', B' and C' are sequentially enabled by multiplexer 158, thereby allowing the x, y and z coordinates of transmitter A to be found. Next, driver B impulses transmitter B three times in sequence. Sensors A', B' and C' are sequentially enabled, allowing the x, y, and z coordinates of transmitter B to be calculated. The same action occurs with respect to transmitter C. Once the coordinates of all three of transmitter A, B and C are known, the roll, pitch, and yaw position of head 150 can be calculated. Thus nine operations of transmitters A, B, and C enable all 6 degrees of freedom of head 150 to be determined.

Figure 9:
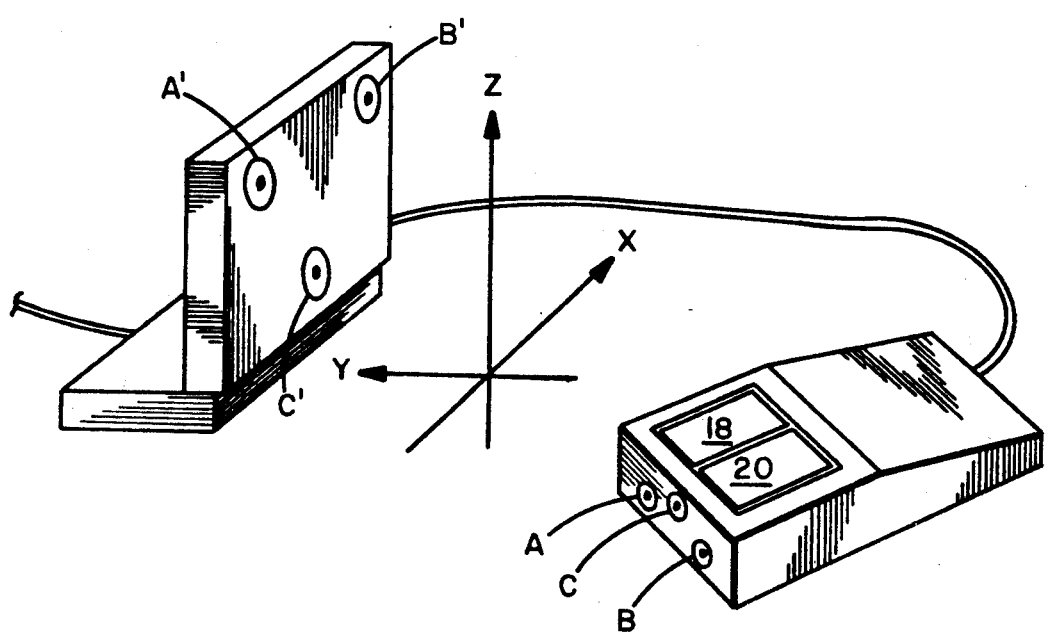
FIG. 9 is a perspective view of a modification to the embodiment of FIG. 8.

FIG. 9 shows the same configuration as in FIG. 8 except that the transmitter array is contained in an enclosure that slides on the table top. In this configuration, x,y motion is parallel to the table plane and z motion is perpendicular to the table plane. This configuration still provides x, y, z and roll, pitch and yaw output.

While the invention has been particularly shown and described with respect to a preferred embodiment thereof, it will be understood by those skilled in the art that changes in form and details may be made therein without departing from the scope and spirit of the invention. For instance, while the acoustic sensors have been illustrated as free-standing, they could be integrated into the case or keyboard of a display.

What is claimed is:

1. An acoustic mouse system for controlling indications on an X-Y surface of the face of a display, the system comprising:

support means for holding at least three acoustic receivers in an x-y plane;

hand movable, acoustic transmitter means movable in said x-y plane and in a z direction perpendicular to said x-y plane, for generating a periodic acoustic oscillations in the direction of said support means;

detector means, responsive to outputs from said acoustic receivers, for providing signals indicative of the absolute position of said transmitter means in said x-y plane and in said z direction; and processor means responsive to said signals from said detector means for providing position signals to said display, whereby said display responds to signals indicative of the absolute position of said transmitter means in said x-y plane by moving a displayed indication to a corresponding position on the X-Y surface of said display face, said display further responding to a z position signal from said processor means by altering an indication on said display.

2. The acoustic mouse system of claim 1, further comprising:

switch means for selectively enabling said mouse system to pass to said display, a z position signal indication.

3. The acoustic mouse system of claim 2 wherein said position signals provided by said processor means indicate absolute x and y positions of said transmitter means.

4. The acoustic mouse system of claim 3 wherein said switch means is mounted on said acoustic transmitter means.

5. The acoustic mouse system of claim 4 wherein said acoustic transmitter means is a stylus.

6. The acoustic mouse system of claim 4 wherein said acoustic transmitter means is finger mountable and comprises:

a point source acoustic transmitter;

a housing for said transmitter, said housing having a concave portion for mating with a user's finger; and switch means for actuating the generation of a control signal from said mouse, said switch means positioned on said housing for finger actuation.

7. The acoustic mouse system of claim 1 wherein non-acoustic communication between said transmitter means and said processor means occur over a wireless infrared communications link.

8. A finger mountable acoustic transmitter comprising:

a point source acoustic transmitter;

a housing for said transmitter, said housing exhibiting a concave section that mates with a user's finger; and switch means mounted on said housing for actuating the generation of a control signal from said mouse, said switch means positioned for finger actuation.

9. The acoustic transmitter as recited in claim 8 further comprising:

a flexible wrap for holding said user's finger within said concave portion of said housing.

10. An acoustic mouse system for controlling indications on a X-Y surface of the face of a display, the system comprising:
   support means for holding at least three acoustic transmitters in an x-y plane;
   hand-movable, acoustic receiving means movable in said x-y plane and in a z direction perpendicular to said x-y plane, for receiving periodic acoustic oscillations from said acoustic transmitters;
   detector means responsive to signals received by said acoustic receiver for providing signals indicative of the absolute position of said acoustic receiving means in said x-y plane; and
   processor means responsive to said signals from said detector means for providing absolute position signals to said display, whereby said display responds by moving an indication to a corresponding position on the X-Y surface of said face.

11. The acoustic mouse system of claim 10, wherein said detector means provides a further signal indicative of the z direction position of said acoustic receiving means, said display responding to a z-position signal from said processor means by altering an indication on said display.

12. The acoustic mouse system of claim 10 wherein non-acoustic communications between said receiving means and said processor means occur over a wireless infrared communications link.

13. An acoustic mouse system comprising:
   support means for holding at least three acoustic receivers in an x-y plane;
   acoustic transmitter means, including at least three acoustic transmitters, movable in said x-y plane and in a z direction perpendicular to said x-y plane, for generating a periodic acoustic oscillation from each said transmitter in the direction of said support means;
   detector means, responsive to outputs from said acoustic receivers, for providing signals indicative of the absolute x, y and z positions of each said acoustic transmitter; and
   processor means responsive to said signals from said detector means for determining roll, pitch and yaw positions of said transmitter means.

14. The acoustic mouse system of claim 13 further comprising:
   means for sequentially operating each transmitter at least three times; and
   means for sequentially enabling said acoustic receivers in synchronism with the operation of each transmitter.

15. An acoustic mouse system comprising:
   support means for holding at least three acoustic receivers in an x-z plane;
   acoustic transmitter means, including at least three acoustic transmitters, slidably movable on a support surface in an x-y plane perpendicular to said x-z plane and hand removable from said x-y support plane to move in said x-z plane, for generating a periodic acoustic oscillation from each said transmitter in the direction of said support means;
   detector means, responsive to outputs from said acoustic receivers, for providing signals indicative of the absolute x, y and z positions of each said acoustic transmitter; and
   processor means responsive to said signals from said detector means for determining roll, pitch and yaw positions of said transmitter means.

16. The acoustic mouse system of claim 15 further comprising:
   means for sequentially operating each transmitter at least three times; and
   means for sequentially enabling said acoustic receivers in synchronism with the operation of each transmitter.

* * * * *